Oct. 10, 1967 R. K. LYON 3,346,339
CARBON BLACK PRODUCTION
Filed Aug. 24, 1964
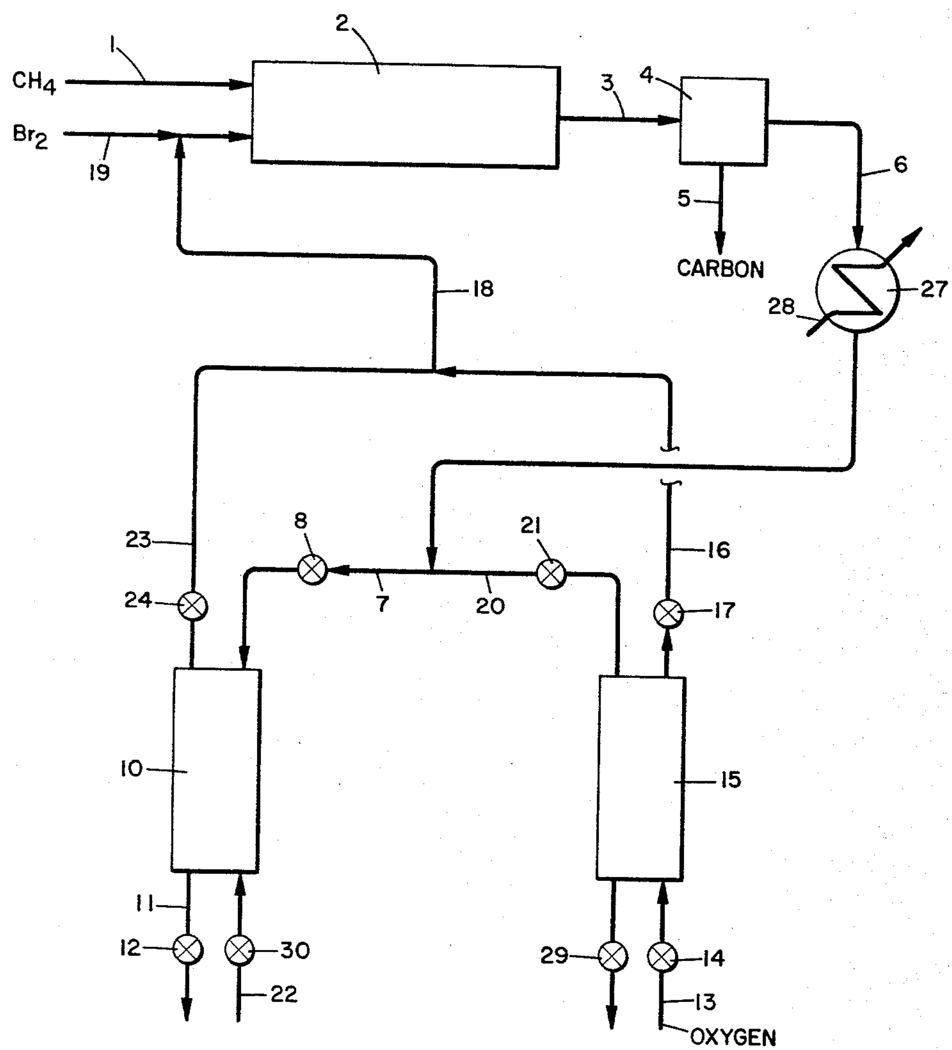
RICHARD K. LYON INVENTOR
BY Perry Carvellas
PATENT ATTORNEY United States Patent Office 3,346,339

Patented Oct. 10, 1967

3,346,339

CARBON BLACK PRODUCTION

Richard K. Lyon, Elizabeth, N.J., assignor to Esso Research and Engineering Company, a corporation of Delaware Filed Aug. 24, 1964, Ser. No. 391,612
11 Claims. (Cl. 23—209.1)

ABSTRACT OF THE DISCLOSURE

Hydrocarbons and oxygen are catalytically converted to carbon black and water using a bromine-hydrogen bromide-metal bromide catalyst system.

This invention relates to the production of carbon black. This invention relates to a process and catalyst system for the conversion of hydrocarbons to carbon black. The invention particularly relates to the catalytic conversion of normally gaseous hydrocarbons to carbon black by contacting the hydrocarbons with free bromine at elevated temperatures to form carbon black and hydrogen bromide. The hydrogen bromide formed is subsequently contacted with a metal oxide to form the metal bromide and water. The metal bromide is then oxidized at elevated temperatures and free bromine and the metal oxide are recovered and the bromine is recycled to the process. The catalyst system includes a metal oxide which is converted to metal bromide which is then converted back to the metal oxide and free bromine. The metals which may be used in accordance with the present invention are the transition metals. Preferred metals are members of the group consisting of cobalt, iron, and nickel.

Heretofore, carbon black had been produced in furnaces by high temperature pyrolysis of hydrocarbons. Hydrocarbons were fed into the furnace in contact with chlorine gas and a controlled amount of oxygen which mixture was ignited and burned. The hydrocarbons were converted to carbon black and a tar material and hydrogen chloride gas. This technique had several drawbacks. With the introduction of air into the system, some water or steam formed which diluted the hydrogen chloride. Also, the tar that was formed deposited on the carbon formed and required a separate step to separate the tar from the carbon black. One technique for removing the tar was to utilize a solvent extraction step whereby a chlorinated solvent was used to selectively extract the tar material from the carbon black. The carbon black was then dried and the solvent recovered. This process required an independent source of chlorine gas and also required a market for the hydrogen chloride produced. In areas where there was no market for the hydrogen chloride produced, this represented a serious disposal problem. Further, introduction of oxygen or oxygen-containing gases into the reaction zone represents a loss of carbon in the formation of carbon monoxide and carbon dioxide gases. Also hydrogen chloride was lost by the formation of water from the hydrogen released from the decomposition of the hydrocarbon reacting with the oxygen.

In many of the known hydrocarbon conversion processes, hydrocarbon streams, which have little market value at the particular location, are formed, which represent a debit to the overall process. This is particularly true in areas where there is no market for normally gaseous hydrocarbons produced in fluid catalytic cracking processes which are flared to the atmosphere. However, other streams can be formed in a hydrocarbon conversion process which at the particular location may be of little or no value. These hydrocarbons can be converted into carbon black which has a high fuel value and/or which has particular value in the rubber industry. An economic means of converting low value hydrocarbon streams to carbon black represents a considerable advantage for any process where such a stream is produced.

The present invention describes catalytic conversion of hydrocarbons to carbon black. More particularly, the present invention relates to a catalytic process for the conversion of hydrocarbons to carbon black, which process utilizes a novel catalyst system for carrying out the process; the process is carried out in three steps. In the first step the hydrocarbon is contacted in a reaction vessel with free bromine gas. The two gaseous streams are contacted in a suitable reactor and spontaneously react to decompose the hydrocarbon essentially to carbon black and hydrogen. The hydrogen reacts with the free bromine gas to form hydrogen bromide. The reaction products are hydrogen bromide gas and solid carbon black particles, which are then separated. The first step of the process is preferably carried out in the absence of oxygen in the reaction zone.

In the second step of the process, the hydrogen bromide gas is contacted with a transition metal oxide to form the metal bromide plus water. This reaction is preferably carried out at a sufficiently high temperature so that the water present is in the form of steam and is vented from the reaction vessel to the atmosphere. The metal oxide can be in the form of small to medium size particles or the metal oxide can be deposited on a suitable inert carrier material. This step can be carried out in a fixed bed, a moving bed, or a fluid bed. Though the reaction goes at ambient temperature and pressure, there is the added advantage of carrying it out at slightly elevated temperatures so that the water is removed from the reactor as steam and there is very little, if any, water present in the reactor.

In order to recover the bromine from the metal bromide so that it can be recycled to the hydrocarbon decomposing reaction zone, air, oxygen, or oxygen-enriched air is fed into the reactor containing the metal bromides at elevated temperatures. The metal bromide is oxidized to metal oxide releasing free bromine gas. This reaction is continued until just before oxygen breakthrough. The bromine gas recovered can be essentially bromine gas or can be diluted with nitrogen in the event that air was used to carry out the oxidation step. After the metal bromide is converted to metal oxide, this step is stopped, and the free bromine gas is recycled to the hydrocarbon conversion zone.

By using two metal oxide-containing vessels alternately, the first being used to recover the hydrogen bromide gas from the conversion zone by changing the metal oxide to metal bromide and at the same time the second of the vessels being used to liberate free bromine from the metal bromide, the process can be carried out continuously by alternating between the two vessels.

The catalyst system of the present invention is substantially independent of the need of an outside source of bromine. This process recovers and regenerates its own bromine. The products of the process are carbon black, which is readily marketable, and water which is easily disposed of and does not constitute a contamination problem. The process of the present invention can be carried out at moderate temperatures and pressures. The metals that can be used as the metal oxides in accordance with the present invention are the transition metals, e.g. iron, cobalt, nickel, ruthenium, rhodium, palladium, and platinum. The preferred metals are cobalt, nickel, and iron; the latter metals are inexpensive and easily obtainable. These metals can be converted from the oxide to the bromide and from the bromide back to the oxide relatively easy. Magnesium can also be used. Substantial advantage accrues to the system by carrying out the hydrocarbon decomposition step in the absence of air in the reaction zone in that it is carried out without the formation of tar material deposited on the carbon black, without the formation of water by the oxidation of released hydrogen, and without the formation of carbon monoxide, which would represent a loss of carbon to the system. By using the process of the present invention, the hydrogen bromide formed does not represent a contamination problem.

The use of a free chlorine gas, as in the prior art, as a catalyst for the system instead of bromine would not result in an operable system in that the conversion of the metal chloride to the free chlorine gas cannot be carried out at all or cannot be efficiently carried out at reasonable temperatures and pressures; therefore, a free chlorine gas catalyst cannot be used in the present invention. The invention has a particular advantage in areas where there are large amounts of natural gas and normally gaseous hydrocarbons or other hydrocarbon streams which have a low value at the particular location.

In accordance with this invention, the hydrocarbons can be conveniently and easily converted into high value carbon black in a relatively inexpensive, economic, and practical process.

The figure of the drawing is a schematic diagram of a carbon black producing process which illustrates a catalytic hydrocarbon decomposition zone, a metal oxide, and a metal bromide conversion unit and the recycle of free bromine gas to the hydrocarbon decomposition zone.

Any hydrocarbon feed that can be decomposed to form carbon black and water can be used in accordance with the present invention. The feed may be obtained from petroleum sources or from destructive distillation of coal or other carbonaceous materials. Preferably, the hydrocarbons used in the present invention are petroleum hydrocarbons which have little economic value at the site produced. The hydrocarbons used in accordance with the present invention are normally gaseous hydrocarbons obtained either directly from the well or from hydrocarbon conversion reactions. Specific hydrocarbon feed materials that can be used are natural gas, coal gas, ethylene, propylene, acetylene, and the like. The hydrocarbon to be converted can be diluted by inert gases, such as nitrogen. A preferred feed which can be used in accordance with the present invention is a methane-containing gas.

The catalyst used to carry out the hydrocarbon conversion is essentially anhydrous free bromine gas. This bromine gas is used in the present invention catalytically and converts the hydrocarbon to essentially carbon and hydrogen bromide. The catalyst system of this invention involves the recovery of the bromine from the hydrogen bromide by contacting the hydrogen bromide with a metal oxide whereby the metal oxide is converted to the metal bromide. The free bromine is recovered from the metal bromide by burning the metal bromide with air, oxygen, or an oxygen-containing gas to regenerate the metal oxide and to release free bromine gas. The preferred metals that can be used in accordance with the present invention are cobalt, nickel, and iron. The preferred metal is cobalt. Metal oxides, other than the transition metals, can be used, but difficulty is encountered in either the formation of the metal bromide or regeneration of the free bromine from the metal bromide. The metal oxide can be impregnated or deposited on various inert carriers, such as alumina, silica, silica alumina, clay, and the like. Also, the metal oxide can be used in the solid form as particles of the metal rather than be deposited on a carrier.

The first step of the present process, that is, the catalytic conversion of the hydrocarbon feed to carbon and hydrogen bromide, can be carried out at temperatures of 500 to 2000° F., more generally at temperatures of 800 to 1700° F., and preferably at temperatures of 1200 to 1400° F. The conversion step can be carried out at pressures of 0 to 15 p.s.i.g. and conveniently at about atmospheric pressure; however, superatmospheric and subatmospheric pressures can be used in situations where the particular feed stream may be at elevated or reduced pressures or where it may be advantageous to use elevated or reduced pressures to carry out the separation of the carbon black from the normally gaseous hydrogen bromide.

The hydrocarbon stream to be treated can be preheated to a temperature below its cracking temperature; for example, about 750° F. Preheating, however, is not necessary. The amount of hydrocarbon feed to free bromine gas fed to the conversion zone will be at least equivalent to 1 atom of bromine per atom of hydrogen present in the hydrocarbon feed; for example, with methane, the ratio of $Br_2$ to methane would be 2 moles of $Br_2$ to 1 mole of methane, and, accordingly, if the hydrocarbon gas consisted essentially of propane, there would be 4 molecules of $Br_2$ for each molecule of propane fed to the reaction zone. The bromine reacts stoichiometrically with the hydrocarbon feed and sufficient hydrocarbon or a slight excess of hydrocarbon should be present to convert essentially all of the bromine to hydrogen bromide. The residence time of the hydrocarbon feed in the reaction zone will depend on the molecular weight of the hydrocarbon being converted and the temperature of the reaction. Generally, the residence time will be 100 to $10^{-3}$ seconds, more generally 1 to $10^{-3}$ seconds, and preferably .1 to .01 second.

In the second step of the reaction, the hydrogen bromide is recovered by contact with a metal oxide whereby the metal oxide is converted to the metal bromide and the hydrogen to water. This step can be carried out at temperatures of 200 to 2000° F., more generally 300 to 1000° F., and preferably 800 to 1000° F. This step can be carried out at pressures of 0 to 15 p.s.i.g. and the pressure is not particularly critical. The step is to be carried out preferably in the vapor phase and under conditions which the water produced by the reaction with the metal oxide is vented as steam from the system. The residence time of the hydrogen bromide in the metal oxide reaction vessel varies somewhat with the length of the vessel and the amount of material converted. Normally, the hydrogen bromide is continuously fed to the vessel containing the metal oxide until just before there is a hydrogen bromide breakthrough at the other end of the vessel, at which time the reaction is stopped. The hydrogen bromide breakthrough point can be easily determined by various conventional means. The water produced in the reaction in the conversion of metal oxide to metal bromide is vented from the system so that on completion of the reaction, the system is essentially dry.

The third step of the process in the catalyst reaction system is carried out by introduction of air, oxygen, and/or oxygen-enriched air to the reactor containing the metal bromide. This reaction is carried out at temperatures of 600 to 2000° F., more generally 600 to 1500° F., and preferably 800 to 1000° F. This step can be carried out at pressures of about 15 p.s.i.g. and the pressure is not critical. The step is carried out in the vapor phase. The oxygen is introduced into the vessel and reacts with the metal bromide to produce the metal oxide. The effluent gas, where air is used, consists essentially of the free bromine and nitrogen. The reaction is continued until just before oxygen breakthrough, at which time the reaction is stopped. The heat to start this process can be provided by preheating the air or oxygen-enriched air that is used to carry out the process which, on contact with the metal bromide, spontaneously reacts to give off the needed heat to continue the reaction.

The residence time in this reactor will depend on the length of the vessel, but the reaction is almost instantaneous and a long residence time is not required. The residence time and temperatures can vary somewhat with the particular metal oxide that is used.

The carbon produced in accordance with the present invention is a high surface area, relatively dense carbon black material which is suitable for use in the rubber industry or which can be briquetted and used as a fuel per se.

The reaction vessel in which the hydrocarbon feed is decomposed to essentially carbon and hydrogen bromide can be an elongated, cylindrical vessel into which are fed the hydrocarbon stream and the free bromine gas feed stream. These two streams can be arranged in such a manner that the gases coming through the nozzles are efficiently mixed within the vessel thereby providing very efficient contact of the two gases in the vessel. The reaction proceeds spontaneously within the vessel. The vessel should be constructed of materials which can withstand the elevated temperatures of up to about 2200° F., which would be a maximum temperature for the reaction and be corrosion resistant to the hydrogen bromide gas formed at these temperatures. The reaction vessel should also be constructed in such a manner that the deposited carbon formed from the decomposition reaction can be periodically removed from the vessel, such as by scrapers or screw conveyors. However, the presence of carbon in the vessel is not deleterious to the extent that it provides a large surface area on which the hydrocarbon conversion reaction can be carried out and on which the deposited carbon can lay down.

A conventional gas-solids separator can be used to remove entrained carbon particles from the hydrogen bromide gas produced. This can constitute filter bags in series or electrolytic precipitators, or gas-solids cyclone separators. Also a fluid-solids bed can be used as a reactor; for example, a fluidized bed of coke could be used. One or more metal oxide-containing vessels can be used, separately or alternately, so that the process may be continuous. These vessels can be elongated, cylindrical vessels containing the solid metal oxide particles or metal bromide particles which are contacted with, in one case, the hydrogen bromide gas to form the metal bromide and, in the other case, the metal bromide particles which are reacted with oxygen to form the metal oxide and $Br_2$. These can be of conventional structure and constructed in the manner known in the art.

Various heat exchange means are provided throughout the system to recover heat from hot gases and to provide preheat for the incoming gas streams. Make-up heat can be provided by conventional fuel-fired furnaces and make-up bromine can be provided from a separate bromine source.

The invention will be described with reference to the figure of the drawing to illustrate a preferred embodiment of the present invention so that it may be better understood. Referring to the figure of the drawing, a natural gas feed consisting essentially of 98% methane is introduced through line 1 into reaction vessel 2. In the reaction vessel it is mixed with an equivalent amount of free bromine diluted with nitrogen introduced through line 19. The two streams are introduced through nozzles and thoroughly mixed in reactor 2. The two gases are intimately mixed in reaction zone 2 and are introduced at a molar ratio of methane to bromine of 1:2. The two gases react essentially stoichiometrically to produce carbon black, which precipitates and/or is entrained in the reaction gases, and hydrogen bromide. The reaction is carried out spontaneously on contact of the two gases at a temperature of about 1200° F. The effluent gases are withdrawn through line 3 and contain entrained therein carbon black particles. The effluent gas is introduced into a suitable gas-solids separator, for example, a gas cyclone 4, wherein the carbon particles are removed through line 5. The gases free of entrained carbon particles are withdrawn through line 6 and introduced into indirect heat exchanger 27, cooled by cooling water introduced through line 28. The gases are cooled down to a temperature of about 200 to 600° F. and are fed through line 6 and line 7 via valve 8 into a vessel 10. Vessel 10 contains cobalt oxide in finely-divided form from the size of about ¼ inch to about 4 mesh. Hydrogen bromide gas is reacted with the cobalt oxide at about 900° F. and ambient pressure whereby the cobalt oxide is converted to cobalt bromide. The hydrogen bromide is continuously fed to vessel 10 until substantially all of the cobalt oxide is converted to cobalt bromide. This reaction is preferably carried out at a temperature of about 900° F. The water produced in this reaction is present as steam and is vented through line 11 and valve 12 to the atmosphere. In this step of the process valves 8 and 12 are open and valves 30 and 24 are closed. In this manner the bromine is recovered from the hydrogen bromide stream by conversion of the cobalt oxide to cobalt bromide in vessel 10.

The bromine is recovered in this process by feeding air through line 13 and valve 14 into vessel 15 wherein cobalt bromide is converted by oxidation to cobalt oxide at temperatures of about 800 to 1000° F. releasing free bromine gas. The bromine gas is taken through line 16 and valve 17 and line 18 into the bromine feed stream 19. In this step of the process, valves 14 and 17 are open and valves 21 and 29 are closed. Make-up bromine can be added from an independent source as needed. Bromine gas introduced through line 18 can be preheated if needed by a heat exchanger, not shown. Heat recovered from heat exchanger 28 can be used to preheat the feed streams. The oxygen introduced through line 13 and valve 14 can be preheated to 800 to 1000° F. if needed by means not shown through an indirect gas-fired heat exhanger.

The methane feed is introduced at a rate of 90 to 100 parts per minute and the bromine gas feed is fed at a rate of about 180 to 200 parts per minute. At temperatures of 1000 to 1200° F. the methane and bromine react to form hydrogen bromine and carbon almost quantitatively. HBr gas is produced at a rate of about 360 to 200 parts per minute. This gas can contain varying amounts of nitrogen, depending on whether air or oxygen enriched air was used to carry out the conversion of the cobalt bromide to cobalt oxide.

The carbon black recovered from the reaction is of a high-surface area, carbon black material suitable for various known uses. Carbon black is recovered in the form of flocculent carbon black, which material can be pelleted if desired. An important feature of the invention is reacting the bromine asd hydrocarbon in the absence of other reactant gaseous materials, such as oxygen. Presence of nitrogen diluent is an advantage as a carrier to push out the steam product of the reaction from the metal oxide to metal bromide step.

The invention may be better understood and is further illustrated by the acompanying examples.

*Example I*

In this example 5% $CH_4$ diluted with 95% nitrogen were mixed with $Br_2$ gas at a ratio of 2 moles of $Br_2$ per each mole of methane. The methane was introduced into a 2.26 cc. reactor at a rate of 0.60 cc./sec. The reaction was carried out at temperatures of about 1600 to 1800° F. About 80% of the methane was converted to carbon and hydrogen bromide.

The recovered carbon product was glossy and brittle and had a surface area of 97 $m.^2/gm.$, as well as a small crystallite size (less than 50 A).

In a similar run, but without added $Br_2$, there was no conversion at all.

*Example II*

In this example 98% $C_5$ to $C_8$ naphtha stream is vaporized and mixed with an equivalent amount of $Br_2$. The $Br_2$ from the metal bromide conversion step contains about 67% nitrogen. The two gases are intimately mixed in the reaction chamber and the $C_5$ to $C_8$ naphtha is 90% converted at a temperature of about 1700 to 1800° F. to carbon black and hydrogen bromide. The effluent stream is cooled and entrained carbon separated. The hydrogen bromide is cooled to about 800 to 1000° F. and is directly contacted in a vessel containing particles of cobalt oxide at a temperature of about 800 to 1000° F. The bed is operated as a fixed bed and the hydrogen bromide feed is continued until substantially all of the cobalt oxide is converted to cobalt bromide.

A preheated air stream at a temperature of about 800° F. is introduced into the cobalt bromide-containing vessel wherein the cobalt bromide is oxidized to cobalt oxide and free bromine gas is produced. The oxygen-enriched air feed is continued until substantially all of the cobalt bromide is converted. The free bromine gas obtained is at about 1000° F. and is recycled to the hydrocarbon conversion zone and again contacted with the $C_5$ to $C_8$ naphtha stream to continue the reaction.

The above examples readily illustrate the advantages of using the bromine conversion catalyst system and process in the production of carbon black from hydrocarbons.

It should be obvious from the disclosure of the above-described process that the process and catalyst system are capable of many variations within the scope of the inventive concept as set forth in a previous description and that the invention should not be considered limited by the foregoing specific embodiments described for purposes merely as illustration. The carbon black produced in accordance with the above invention can be used for various known adsorption processes where hydrocarbons are used as selective adsorbents. The carbon black is of sufficient quality as to be used in the production of rubber in the rubber industry, and the carbon black can be pelleted and used for other known uses of high quality carbon black. This process scheme would not work with other halogens. Metal chlorides are so stable that it is difficult and expensive to regenerate the $Cl_2$, while HI is so unstable that it could not be formed in the hydrocarbon decomposition reactor. Pumps, heat exchangers, and circulatory means, conventional in the art, have not been described in order not to overly complicate the description of the process. The invention is only to be limited by the scope of the appended claims.

What is claimed is:

1. A method for making carbon black comprising mixing gaseous hydrocarbon and gas containing free bromine, reacting said hydrocarbon and bromine in a reaction zone at temperatures ranging from about 500° F. to about 2000° F. to form carbon black and gaseous hydrogen bromide, withdrawing gas containing said hydrogen bromide from the reaction zone, passing the withdrawn gas to a particulate metal oxide zone containing a transition metal oxide, reacting the hydrogen bromide with said oxide at a temperature ranging from about 300° F. to about 1000° F. to form steam and a metal bromide of said metal, separating the steam and metal bromide, passing a gas containing free oxygen to a metal bromide zone containing the separated metal bromide at a temperature ranging from about 500° F. to about 2000° F. to liberate free gaseous bromine and metal oxide of said metal, and recycling the free gaseous bromine formed to said reaction zone.

2. The method of claim 1 wherein the transition metal oxide is an oxide of a metal selected from the group consisting of cobalt, iron and nickel.

3. The method of claim 2 wherein said liberated metal oxide is recycled to said particulate metal oxide zone.

4. The method of claim 2 wherein the metal bromide zone and the metal oxide zone are interchanged after the metal bromide in the former is substantially converted to metal oxide and the metal oxide of the latter is substantially converted to metal bromide.

5. The method of claim 2 wherein said metal is cobalt.

6. The method of claim 5 wherein the reaction zone is at a temperature ranging from about 1200° F. to about 1400° F.

7. The method of claim 6 wherein the metal oxide zone is at a temperature ranging from about 800° F. to about 1000° F.

8. The method of claim 7 wherein the metal bromide zone is at a temperature ranging from about 800° F. to about 1000° F.

9. The method of claim 4 wherein the interchange is carried out before conversion to oxides in the metal bromide zone is so complete as to allow a breakthrough of gas containing substantial amounts of free oxygen exiting from the zone.

10. The method of claim 1 wherein the gas containing free bromine includes an inert gas.

11. The method of claim 10 wherein the gas containing free oxygen comprises air.

References Cited

UNITED STATES PATENTS

| | | | |
|---|---|---|---|
| 1,238,734 | 9/1917 | Averill | 23—209.1 X |
| 2,403,735 | 7/1946 | Mason et al. | 23—209.1 X |

FOREIGN PATENTS

| | | |
|---|---|---|
| 664,615 | 1/1952 | Great Britain. |

OTHER REFERENCES

Mellor "Comprehensive Treatise on Inorganic and Theoretical Chemistry," vol. 2, 1922, p. 215.

OSCAR R. VERTIZ, *Primary Examiner.*

EDWARD J. MEROS, *Examiner.*